J. K. Dugdale,

Clothes Washer.

No. 98,855. Patented Jan. 18, 1870.

Witnesses,
Benj. W. Adelleman
Benjamin Dugdale

Inventor:
James K. Dugdale

United States Patent Office.

JAMES K. DUGDALE, OF WHITE WATER, INDIANA.

Letters Patent No. 98,855, dated January 18, 1870.

IMPROVED CLOTHES-WASHER.

The Schedule referred to in these Letters Patent and making part of the same.

Be it known that I, JAMES K. DUGDALE, of White Water, in the county of Wayne, and State of Indiana, have invented a new and useful Improvement in "Clothes-Washers;" and I do hereby declare that the following is a full, clear, and exact description of the construction and operation of the same, reference being had to the annexed drawings, making a part of this specification—

Figure 1:
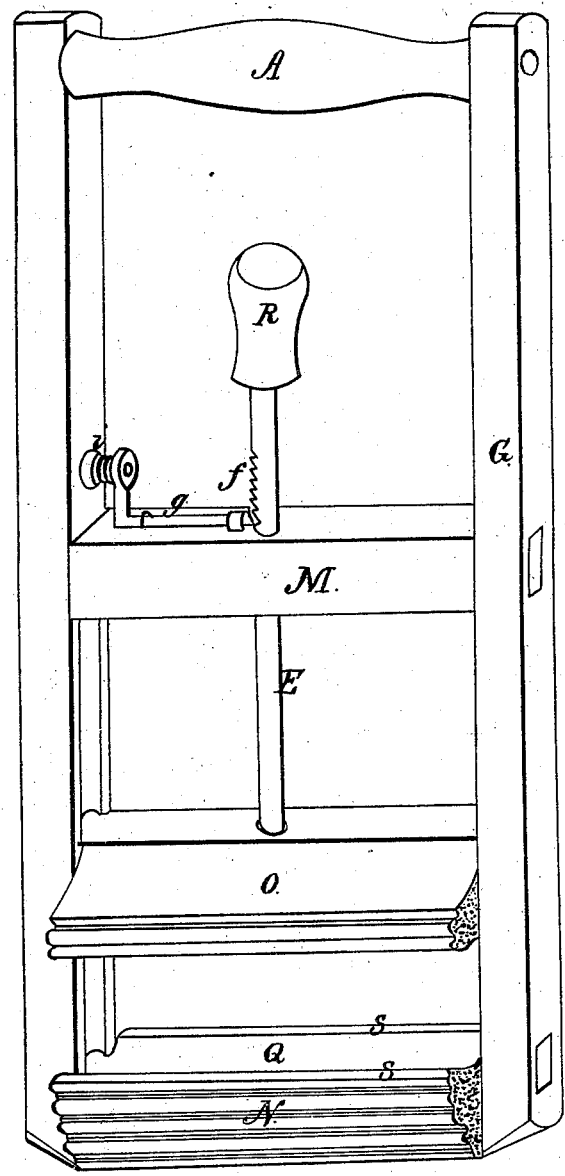

Figure 1 being a perspective view.

G is the frame.

M, a stationary cross-piece.

A, the handle.

N O, the rubber, which is in two parts. The lower part, N, is fastened to the lower end of side-pieces of frame G; the upper part of rubber slides in grooves in said frame. The rubber projects from the frame, forming a rounded surface, which surface may be fluted Q is a cavity in one or both of the parts of the rubbers, making a jaw, S S, on each side thereof, which cavity admits of its shutting together more tightly over buttons, hooks, &c., without endangering them.

Figure 2:
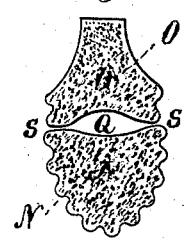

Figure 2 is a sectional view of said rubber, N is the under, and O, the upper part; Q, the cavity; S S, the jaws which hold the clothes.

Figure 3:
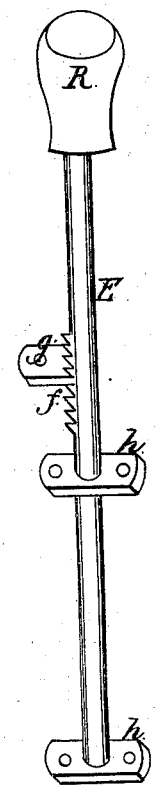

E, fig. 1, a sliding rod, passing through cross-piece M, the lower end of which is fastened in sliding rubber O. A knob, R, is attached to the upper end. There are notches in said rod at $f$, in which bolt $g$ catches. The bolt is pressed against the rod B by spring $i$, or the bolt may be stationary and the notches turned under it, by turning the rod, as shown in Figure 3.

E is the sliding rod; $f$, notches, which catch under bolt or plate $g$; $h\ h$, plates fastening rod E in position to sliding rubber O and cross-piece M.

The clothes are put in the opening made by raising the sliding rubber O, which, being pushed down, they are fastened in.

In operating it, the rubber N may beat the clothes against the bottom of a wash-tub in which a wash-board is fastened. The clothes may be drawn up and down on said wash-board. An extra pressure is obtained by applying one hand to the cross-piece M.

What I claim as my invention and improvement, is—

The hollow rubber N O, when attached to clothes-washers, as described and set forth.

Also, the hollow rubber, in combination with sliding rod E, notches $f$, and bolt $g$.

JAMES K. DUGDALE.

Witnesses:
BENJ. W. ADDLEMAN,
BENJAMIN DUGDALE.